United States Patent [19]

Gorton et al.

[11] Patent Number: 5,077,561
[45] Date of Patent: Dec. 31, 1991

[54] METHOD AND APPARATUS FOR TRACKING SATELLITES IN INCLINED ORBITS

[75] Inventors: W. Daniel Gorton, Littleton; James Burr, Evergreen; Timothy Morris, Littleton, all of Colo.; David C. Tigwell, Spring, Tex.; Michael Cavanaugh, Aurora, Colo.

[73] Assignee: HTS, Englewood, Colo.

[21] Appl. No.: 520,705

[22] Filed: May 8, 1990

[51] Int. Cl.[5] .................................................. G01S 3/46
[52] U.S. Cl. ................................... 342/359; 343/882; 364/459; 342/357
[58] Field of Search ...................... 455/12, 13; 364/459; 342/352, 356, 357, 358, 359, 173, 174; 343/765, 766, 882, 880, 915, 883, 894

[56] References Cited

U.S. PATENT DOCUMENTS

| | | | |
|---|---|---|---|
| 4,126,865 | 11/1978 | Longhurst et al. | 343/882 |
| 4,602,259 | 7/1986 | Shepard | 343/882 X |
| 4,743,909 | 5/1988 | Nakamura et al. | 342/356 X |
| 4,801,940 | 1/1989 | Ma et al. | 342/356 X |

Primary Examiner—Thomas H. Tarcza
Assistant Examiner—Tod Swann
Attorney, Agent, or Firm—Fulbright & Jaworski

[57] ABSTRACT

A computerized antenna mount system for continuously tracking a satellite in geosynchronous orbit that has an inclined orbit with respect to the equator. An antenna mount that automatically adjusts the declination angle of a ground station satellite antenna as a function of time after iteratively compiling the declination angle history from one complete orbit of a satellite. Different satellite orbits may be so compiled with selection of each satellite and its corresponding orbit information from memory.

29 Claims, 15 Drawing Sheets

METHOD AND APPARATUS FOR TRACKING SATELLITES IN INCLINED ORBITS

BACKGROUND OF THE INVENTION

1. Field of the Invention

The present invention relates generally to satellite communications earth station antenna mounts and in particular to a computer controlled antenna mount system and its application in determining and maintaining optimal tracking of geosynchronous satellites whose orbits incline with respect to the equator.

2. Description of the Related Art

Satellites in geosynchronous orbit travel at precisely the same rotational speed as the earth. Thus, a satellite in geosynchronous orbit appears stationary from any point on earth that is within the satellite horizon. In other words, the geosynchronous satellite does not rise or set on the horizon as does the sun and moon, rather, it appears to be continuously at a particular point in the sky.

Many satellites have been launched into geosynchronous orbits with each satellite having a slightly different east-west position in the sky. All of the satellites normally are within a narrow ring called the geosynchronous arc that is within some fixed angle of the south to north horizons at any given point on earth. A polar oriented antenna mount may track satellites in this geosynchronous arc by rotating the mount about the polar axis. Thus, a ground station antenna may be aligned on one geosynchronously orbiting satellite and then may be rotated about its polar axis for acquisition of other such satellites.

Polar mounts allow alignment of ground station antennas with different geosynchronous satellites by rotation about its (single) polar axis. This single-axis tracking is both simple and economical for geosynchronous satellites that do not vary their east-west position significantly. However, any one of these satellites may have appreciable position change in the north-south direction due to orbital inclination. Normally, any non-geosynchronous position change of a satellite requires an antenna mount with azimuth, elevation and polar control for three axis tracking.

Three axis tracking antenna mounts are more complicated and expensive than single axis (polar only) mounts. In addition, the angular position rate of change required to track a geosynchronous satellite in inclined orbit is very slow. Typically, pointing angle changes are from less than one tenth of one degree (0.1) to one degree per hour. For comparison the hour hand on a standard clock turns at the rate of 30 degrees per hour. This slow and minute position change requires precise and repeatable orientation of the antenna mount.

A geosynchronous satellite may change its inclination orbit over a period of time. Different satellites may have different inclination orbits. Thus, the mount holding the earth station antenna must be able to function for different satellite inclination orbits and the corresponding different positional rate of change requirements. A further problem is that the inclination in orbit may vary over the useful life of a satellite.

SUMMARY OF THE INVENTION

The present invention is directed to an antenna mount system that may continuously track the position of geosynchronous satellites with orbital inclination changes. The present invention is not limited to tracking inclined orbit satellites only, it may also track satellites having zero degrees of orbital inclination (non-inclined). The system described in this application utilizes a unique levered, motor actuated declination polar mount and a unique computer program to facilitate the acquisition and tracking of various types of geosynchronous orbit satellites.

In the system of the present invention the satellite ground station antenna mount consists of a support member adapted for connection to a fixed structure and connected to a fixed declination polar axis platform that enables antenna aiming over the geosynchronous orbit arc. A declination motion transfer mechanism is supported by the fixed platform and is connected to and operates a declination adjustment lever. The motion transfer mechanism rotates over small angles about the declination axis.

This lever is connected to and changes the position of a moving declination platform with respect to the north-south (polar) axis. The motion transfer mechanism of the system of the present invention is spring biased to prevent backlash. Backlash in the declination adjustment means may introduce positional errors when moving the antenna mount north (up) and south (down).

An aspect of the present invention is the ability to change the declination angle by a small amount over a period of time. Changes in declination angle, for example, are from less than 0.1 degree to 1 degree per hour. Application of a lever in the present invention enables the use of a standard linear actuator as commonly employed in antenna mounts for moving between different satellite positions. This allows increased resolution in the antenna mount declination movement.

The system of the present invention uses a computer, controlled by a logic program, to control antenna movement, to provide information and control to/from a user interface device, and to maintain a data base for the inclination position.

The system of the present invention iteratively moves the declination position of the antenna mount so as to peak the satellite signal level by using information taken over several samples. Thus, a maximum signal level indicates the best position of the antenna mount (linear actuator extension length) as a function of orbital time within a sidereal day. The next step is to store into the computer memory each position representative of maximum signal level as a function of time in regular intervals (e.g. one minute) over the course of a one sidereal day orbit. Then the system of the present invention will automatically change the declination position of the antenna mount in accordance with this tracking data base thereafter as a function of sidereal time.

An aspect of the present invention is smoothing the collected position information stored in computer memory by averaging each position data value with other data values earlier in time and data values later in time using an equation of the form:

$$Pf(x) = [P(x-n) + \ldots + P(x) + \ldots + P(x+n)]/(2n+1),$$

where P is the sample position data value at time x and Pf(x) is the position averaged over the number of time interval samples n.

An additional aspect of the present invention is smoothing out the noise present on the sample signal level values by calculating an arithmetic mean of a plurality of signal level values taken at equal time intervals over the several seconds of data acquisition for maximum signal level.

The system of the present invention establishes a satellite position data base within 23 hours and 56 minutes. A full sidereal day is 23 hours, 56 minutes and 4.09 seconds. Thus, the system of the present invention continuously tracks the inclined orbital position of a satellite based upon a sidereal day's time. The program of the invention further provides a means of correcting positional data stored in the computer memory by adjusting to orbital inclination changes over time. In addition, the system of the invention synchronizes the data base positional information in two ways: (1) by adjusting the internal clock to the correct orbital phase when there is an equatorial crossing by the satellite, and (2) by shifting the data base by one minute every fifteen days to account for the 4.09 seconds difference per day between the data base time period and the sidereal day period.

An additional aspect of the system of the present invention is to initialize and compile a tracking data base for each satellite desired by the user. After the antenna has been aligned and pointed at the longitude of the inclined orbit satellite desired to be tracked, the computer program of the present invention moves the antenna north and south (around the declination axis) until the satellite is detected. The position of the satellite with respect to the antenna beam is found by iteratively moving the antenna mount north and south until maximum signal level is obtained.

After an interval of time, for example one minute, the antenna is again moved until maximum signal level is obtained. At the next time interval the antenna is moved again, but the movement is in the direction of the last movement and in an amount equal to the previous positional difference. Thus, the satellite signal has little chance of being lost. A complete table of positional data values will be stored in memory within one mean sidereal day.

An aspect of the present invention is the ability to track changes in the declination orbit of a satellite over time by compensating the position data values within the data base. An amplitude correction factor is used to scale the position data values for an increase or decrease in the north-south excursions of the satellite over time. This scale factor is determined by comparing the maximum north and south excursions from the first orbit data acquisition to newly determined maximum excursions and adjusting the scale factor up or down. This adjustment is based upon the ratio of the new excursion maximum north and south positions to the original excursion maximum north and south positions. A typical time interval for calculating this scale factor may be, for example, two weeks, but may be specified by the user to any multiple of a satellite's orbital period.

A further aspect of the system of the present invention is to detect when the satellite crosses the equatorial plane in order to correct for variations between the real time clock of the system and actual orbital time. Thus, the satellite position data base time scale is synchronized with the equatorial plane crossings of the satellite.

An additional aspect of the system of the present invention is calculation of a checksum of the satellite position data base after completion of acquisition of all position data values representative of a complete orbit. This checksum is used to insure the integrity of the data base values.

An aspect of the system of the present invention is an interface between the computer of the invention and the user of the system for entry and selection of system parameters, error annunciation, auto dialing of a telephone, and calibration during installation and orbit acquisition.

Thus, in accomplishing the foregoing objects the present invention with its combination of fixed and moveable declination platforms, levers, motor driven linear actuator, computer system and program software provide a system capable of accurately tracking the declination orbit of geosynchronous satellites, automatically adjusting antenna mount position for optimum signal strength, compensating for changes in declination orbit and periodically re-synchronizing the stored historical position data base with the actual equatorial crossing of the corresponding satellite.

The above-noted and other objects and advantages of the present invention will become more apparent from a detailed description of a preferred embodiment when read in conjunction with the accompanying drawings.

DETAILED DESCRIPTION OF THE PREFERRED EMBODIMENT

Figure 1:
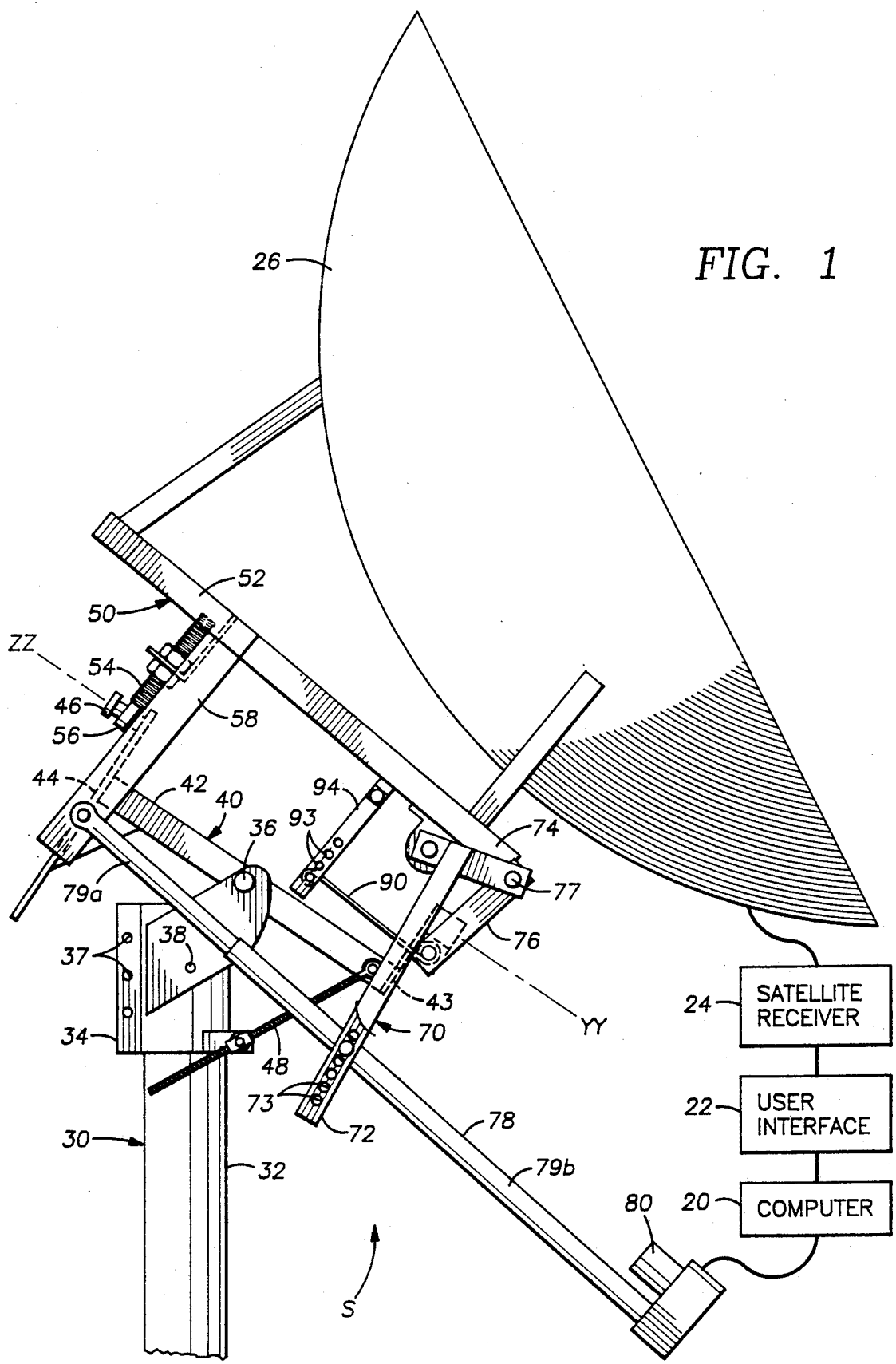
FIG. 1 is an elevational side view of an embodiment of the present invention illustrating the actuator in the center position.

Referring now to FIG. 1, the letter S designates generally a system according to the present invention which is illustrated in block diagram. The system S generally includes an adjustable antenna mount comprising a mounting pole 30 adapted for connection to a fixed structure such as the ground, a fixed declination polar axis platform 40, a moving declination platform 50, declination motion transfer means 70 and backlash prevention means 90.

A computer 20 controls antenna mount declination position by gathering, calculating and storing orbital position information for a plurality of geosynchronous orbit satellites. A user interface 22 provides means for communication with the system of the invention by an installer or user. Satellite receiver 24 connects to, for example, dish antenna 26 which is rigidly mounted to the front face of the moveable declination platform 50.

Referring now to FIGS. 1, 2, 1A, 1B, 3A and 3B, the mounting pole 30 is adapted for connection to a fixed structure that may be mounted in the ground. The pole 30 comprises a tubular body 32, a bracket 34 and a pin 36. The bracket 34 is compressibly attached to the tubular body 32 by, for example, bolts or screws 37. Bolt 38 helps bracket 34 grip tubular body 32.

The fixed declination polar axis platform 40 comprises a body 42 with first and second ends. The body 42 also includes first and second upwardly directed members 43 and 44, respectively at opposite ends of and perpendicular to the body. The fixed platform 40 is pivotally attached to the bracket 34 by the pin 36. Support and orientation of the fixed platform 40 is provided by polar axis alignment adjustment 48 which is adjustably connected between the platform 40 and the bracket 34.

The fixed declination polar axis platform 40 is arranged so that its rotation points, illustrated in FIG. 1 by YY and ZZ, are aligned with the Earth's polar axis 28 upon installation of the system S. The antenna mount may be rotated around this axis for selection of different satellites in geosynchronous orbit.

The moveable declination platform 50 comprises a body 52, fixed declination offset adjustment means 54 and a perpendicular fixed member 58. The fixed declination adjustment means 54 comprises an adjustable length member 54, such as a bolt and nut, that is fixedly connected by support 55 perpendicular to the moveable body 52. The adjustable length member 54 engages the outside of a support ring bearing 56. The support ring bearing 56 rests on support pin 46 which is attached to the upper most end of member 44. The engagement of the support pin 46 in the support ring 56 allows movement of platform 50 in relation to platform 40.

The fixed declination offset adjustment means 54 allows the adjustment of the antenna 26 for a fixed declination offset. This fixed offset is arranged so that (1) the antenna may be pointed to an optimum range of satellite declination angles, that is, the appropriate north and south excursions of the declination tracking mechanism, and (2) the pointing of the antenna 26 may approximately track the geosynchronous orbit by following the conic section swept by the intersection of the cone revolving about the antenna mount's polar axis 28, in the equatorial plane. This fixed offset angle is measured with respect to the polar axis.

The declination motion transfer mechanism 70 moves the moveable declination platform 50 relative to the fixed declination polar axis platform 40. That is, the motion transfer mechanism 70 moves the antenna 26 in order to follow the north and south excursions of an inclined orbit satellite.

Declination motion transfer mechanism 70 comprises declination adjustment member 72 having first and second ends, transfer bar 74 having first and second ends, hinge pin 75, transfer lever 76 having first and second ends, transfer shaft 77, linear actuator 78 and motor 80. The declination adjustment lever 72 has a plurality of connections 73 so that the ratio of the lever lengths provides a match between the maximum distances the actuator 78 must travel and the maximum angular motion desired of the moving declination platform 50. Therefore, many inclined orbit satellites and many different actuators may be adapted by the antenna mount to successfully track inclined orbit satellites.

Figure 2:
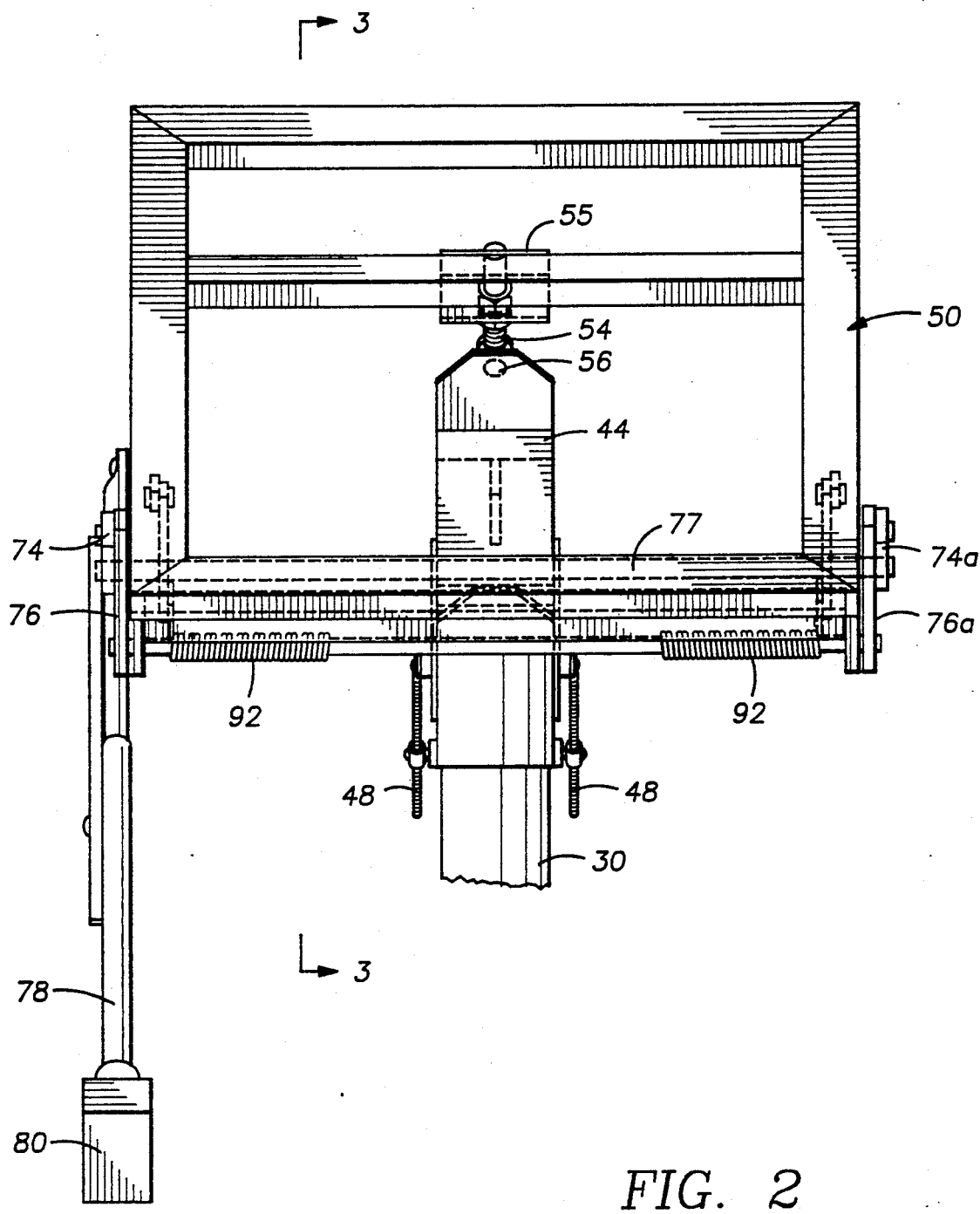
FIG. 2 is an elevational front view of an embodiment of the present invention.

The linear actuator 78 may be of any conventional type having telescoping parts 79a and 79b. One of the parts, such as 79a, is pivotally secured to member 58 and the other part, such as 79b, is secured to a selected one of the connections 73 of the adjustment lever 72. As illustrated in FIG. 2, the transfer bar 74 and a transfer bar 74a are mounted on either side of platform 50. Likewise, the transfer lever 76 and a transfer lever 76a are similarly mounted.

Figure 1A:
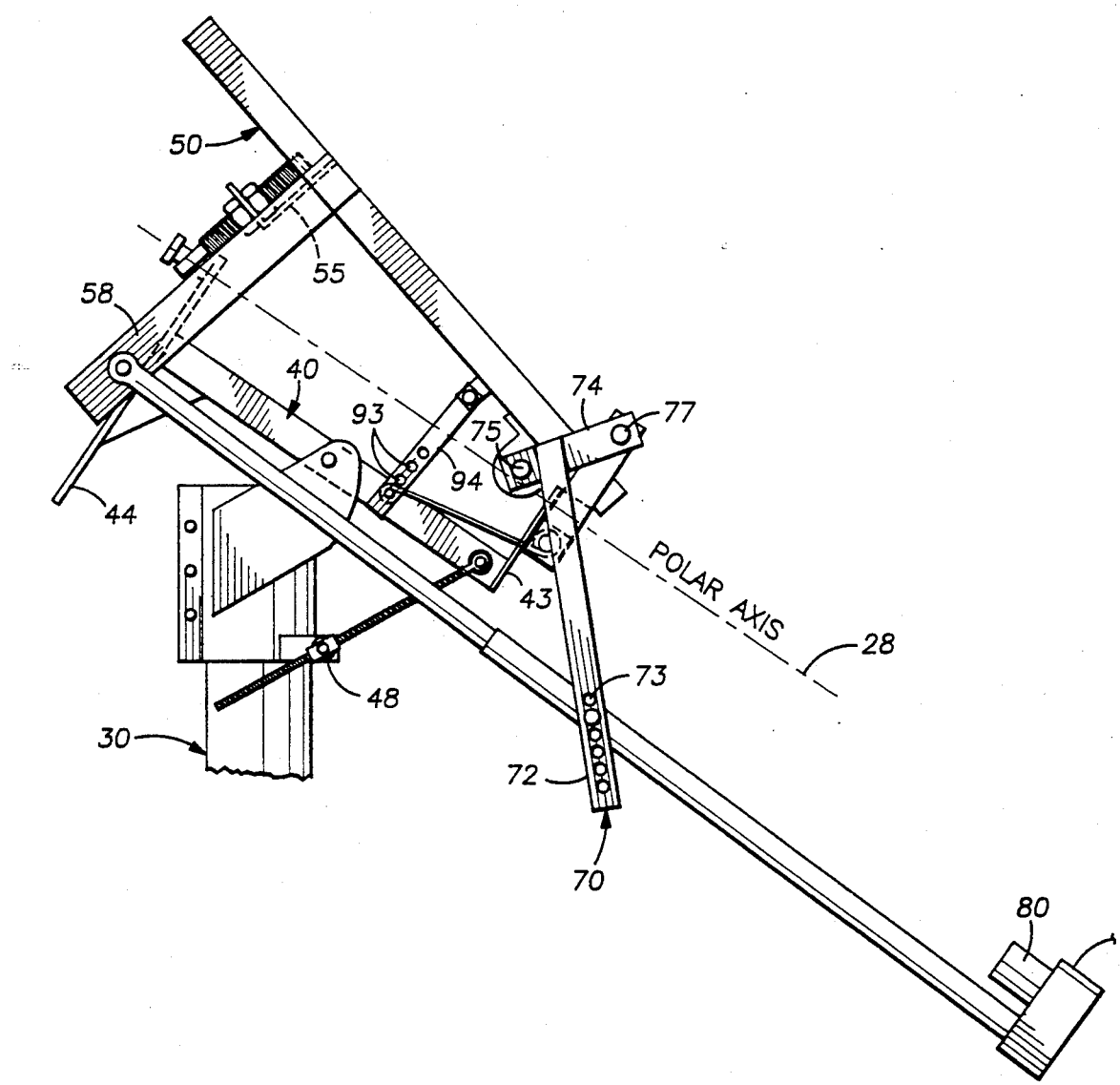
FIG. 1A is a view similar to FIG. 1 showing the actuator in the fully extended or down position.
Figure 1B:
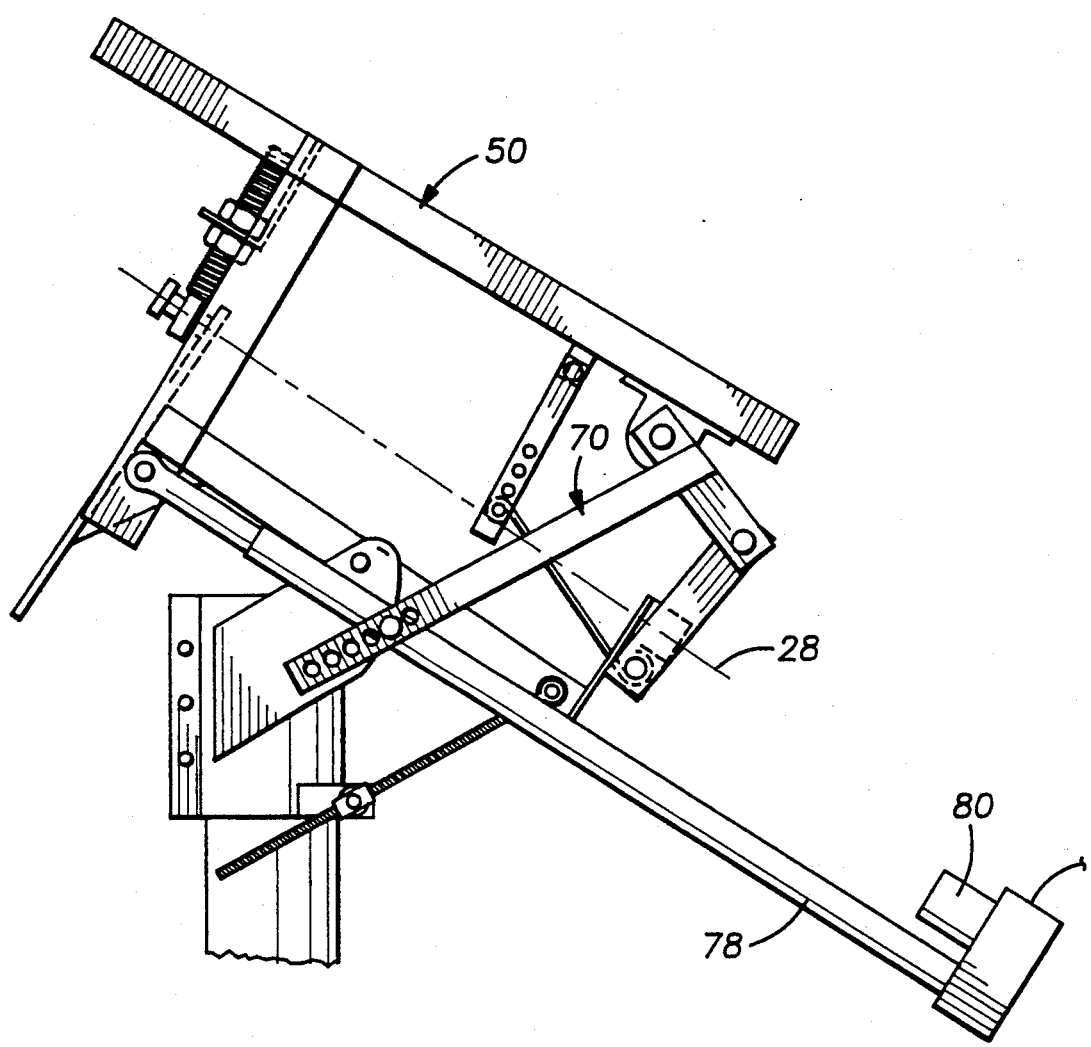
FIG. 1B is a view similar to FIG. 1 showing the actuator in the fully retracted or up position.

Therefore, operation of the motor 80 causes the line actuator 78 to move the adjustment lever 73 between a mid-position illustrated in FIG. 1, a fully extended position illustrated in FIG. 1A and a fully retracted position illustrated in FIG. 1B. The declination lever 72 is fixedly connected to the transfer bar 74 for transmitting the motion of the actuator 78 to the bar 74. The bar 74 has its first end pivotally connected to the moveable declination platform 50 by the hinge pin 75. The second end of the bar 74 is pivotally connected to the first end of the lever 76 by the transfer shaft 77. The transfer shaft 77 angularly locks together the second end of the transfer bars 74 and 74a and the transfer levers 76 and 76a. The second end of the transfer lever 76 is connected to the fixed platform 40 by being pivotally connected to member 43.

The series of lever linkages including adjustment member 72, transfer bars 74 and 74a, and transfer levers 76 and 76a causes a reduction in the angular movement of the platform 50 in relation to the angular movement of this lever assembly by movement of the linear actuator 78. This allows a more precise incremental angular movement of the antenna 26 than would be possible by direct linear actuator coupling of platform 40 to platform 50.

Figure 3A:
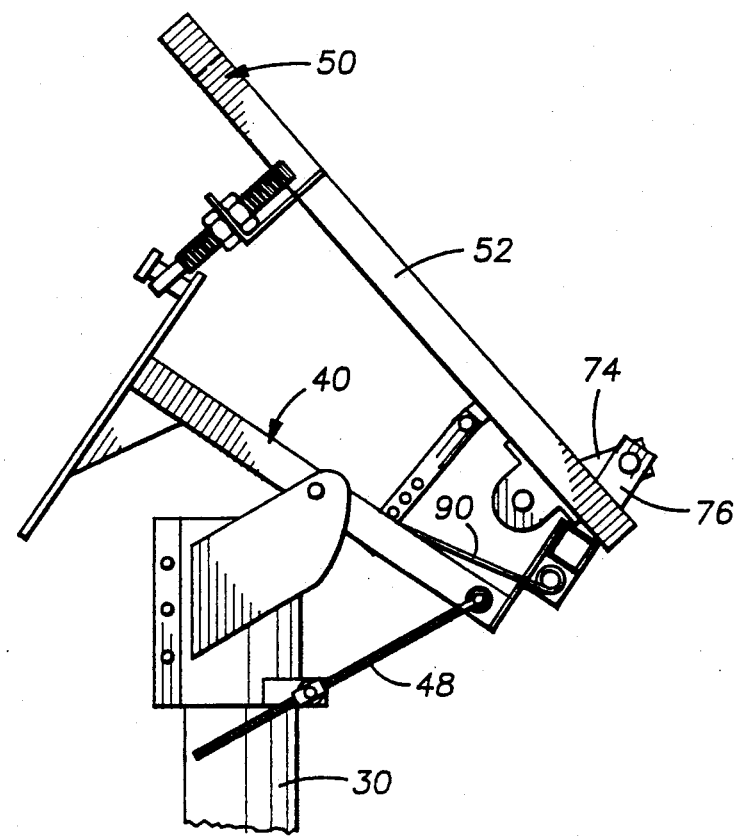
FIG. 3A is an elevational side view, in cross section, taken along the line 3—3 of FIG. 2 illustrating the actuator in the fully extended or down position.
Figure 3B:
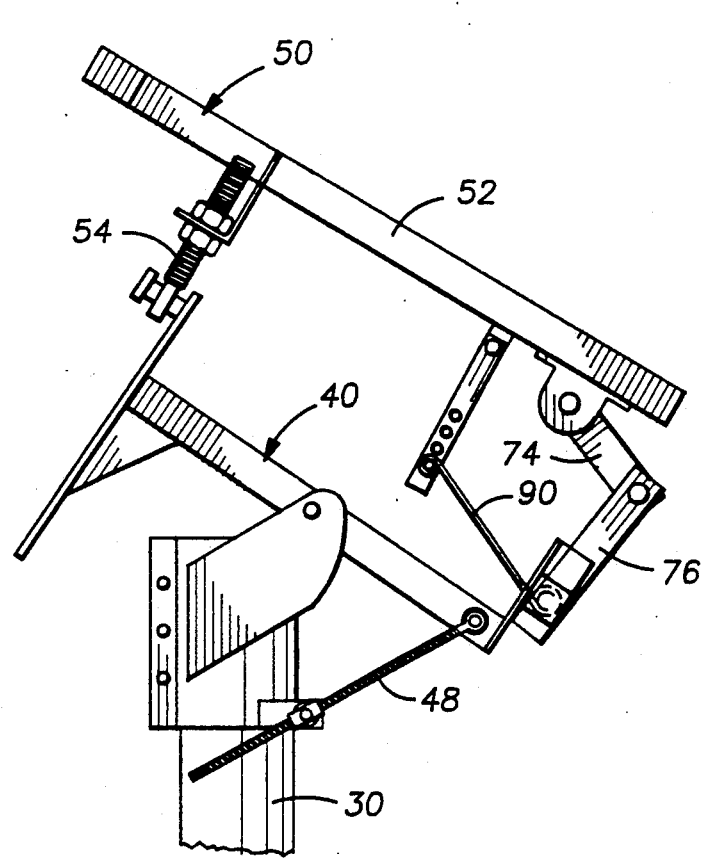
FIG. 3B is an elevational side view, in cross section, taken along the line 3—3 of FIG. 2 illustrating the actuator in a fully retracted or up position.

The motor 80 drives the linear actuator 78 causing the moveable platform to tilt up or down. The computer 20 operates the motor 80, thus controlling declination adjustment of the antenna mount. Referring now to FIGS. 1A, 1B, 3A and 3B, FIGS. 1A and 3A illustrate the antenna mount 50 in the maximum southerly position (down in the northern hemisphere). FIGS. 1A and 3B illustrate the mount 50 in the maximum northerly position (up). The up position corresponds to the linear actuator 78 being fully retracted and the down position corresponds to it being fully extended.

Backlash prevention means 90 is accomplished, for example, by coiled springs 92 as illustrated in FIGS. 1A and 2. The coiled springs 92 bias the transfer lever 76 in relation to the fixed platform 40 in one direction so as to prevent backlash and thus keep close tolerances in the positional alignment of all arts of the antenna mount. Positional errors due to changing motor direction, external forces on the mount structure from wind and mechanical wear in the joints of the transfer mechanism are minimized by the backlash prevention means 90. A member 94 is used to selectably attach one end of the anti-backlash springs 92 to a selected connection 93 for adjustment of anti-backlash spring tension.

The system of the present invention includes a computer program which utilizes a novel set of controls to direct antenna declination movement, provide information to the system user, and to maintain a data base of satellite positions. The computer program provides declination control based upon a motor driven linear actuator's shaft position signals. As the actuator shaft turns, pulses are generated. For example, the linear actuator 78 position signals may be a group of pulses, each pulse representative of either an incremental upward movement or downward movement of the actuator.

By halving the total number of pulses representative of actuator travel, a center position for the actuator is obtained and adjusted to the approximate center of the antenna mount excursion range. These shaft position pulses, whose sum will be representative of declination position, may be referred to as motor counts or simply counts hereinafter.

The following description is a preferred embodiment of the program logic of the invention. Referring now to the drawings, the sequence of instructions utilized in the present invention to cause the computer 20 to establish satellite acquisition, data base information, tracking, signal peaking, and data base correction will be described in detail.

Figure 4:
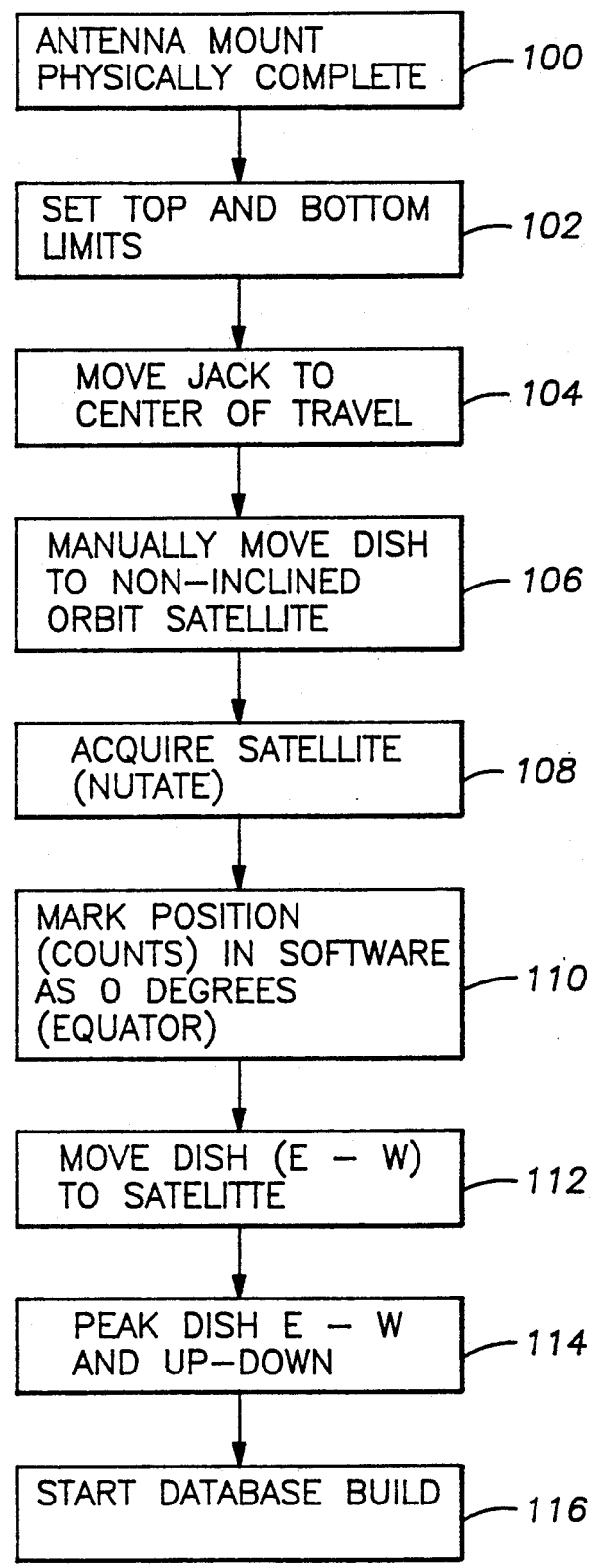
FIGS. 4 through 13 are schematic block diagrams of the logic flow sequences which form a part of the present invention.

The logic program installation routine controls the computer 20 for initializing the system of the present invention after physical installation is completed. Referring now to FIG. 4, the computer 20 begins execution of the installation routine at step 100. Step 100 starts an interactive dialog with the system user through the interactive system display 22. Step 102 causes computer 20 to interactively establish, with the system installer or user, the top and bottom declination position limits of the antenna mount by correlating the linear actuator 78 motor counts as a function of up and down antenna mount positions.

Step 104 causes the computer 20 to center the declination position of the moveable declination platform 50. To establish equatorial position in the program, steps 104, 106, 108 and 110 cause the computer 20 to interactively request the user or installer to manually adjust the mount so as to position the antenna for acquisition of a non-inclined orbit geosynchronous satellite and then marks this position as zero degrees, representative of the equator.

The user may enter a "pilot video" transponder number for specific satellite selection. This information may cause the antenna mount 50 to move either east or west, if so equipped, depending on the approximate location of the selected satellite. Steps 112, 114 and 116 cause the computer 20 to acquire the selected inclined orbit satellite and start to build a data base representative of that satellite's orbit.

The data base building routine may use any one of the following satellite tracking methods: (1) maintenance mode and (2) re-peaking mode. Included in the re-peaking mode are three submodes (i) re-acquistion, (ii) demand and (iii) timed.

The maintenance mode is the normal method of system operation. In the maintenance mode, the logic of the system periodically updates the declination position of the antenna so as to track the selected satellite without loss of signal.

The re-peaking mode may use any one of the following methods for repositioning the antenna so as to maximize signal strength of the satellite: (i) re-acquisition, (ii) on demand, or (iii) after a timed interval. In the re-acquisition mode the satellite is manually re-acquired. The program data base may be updated, if so directed by the user, in the same manner as for new satellite acquisition.

Figure 5:
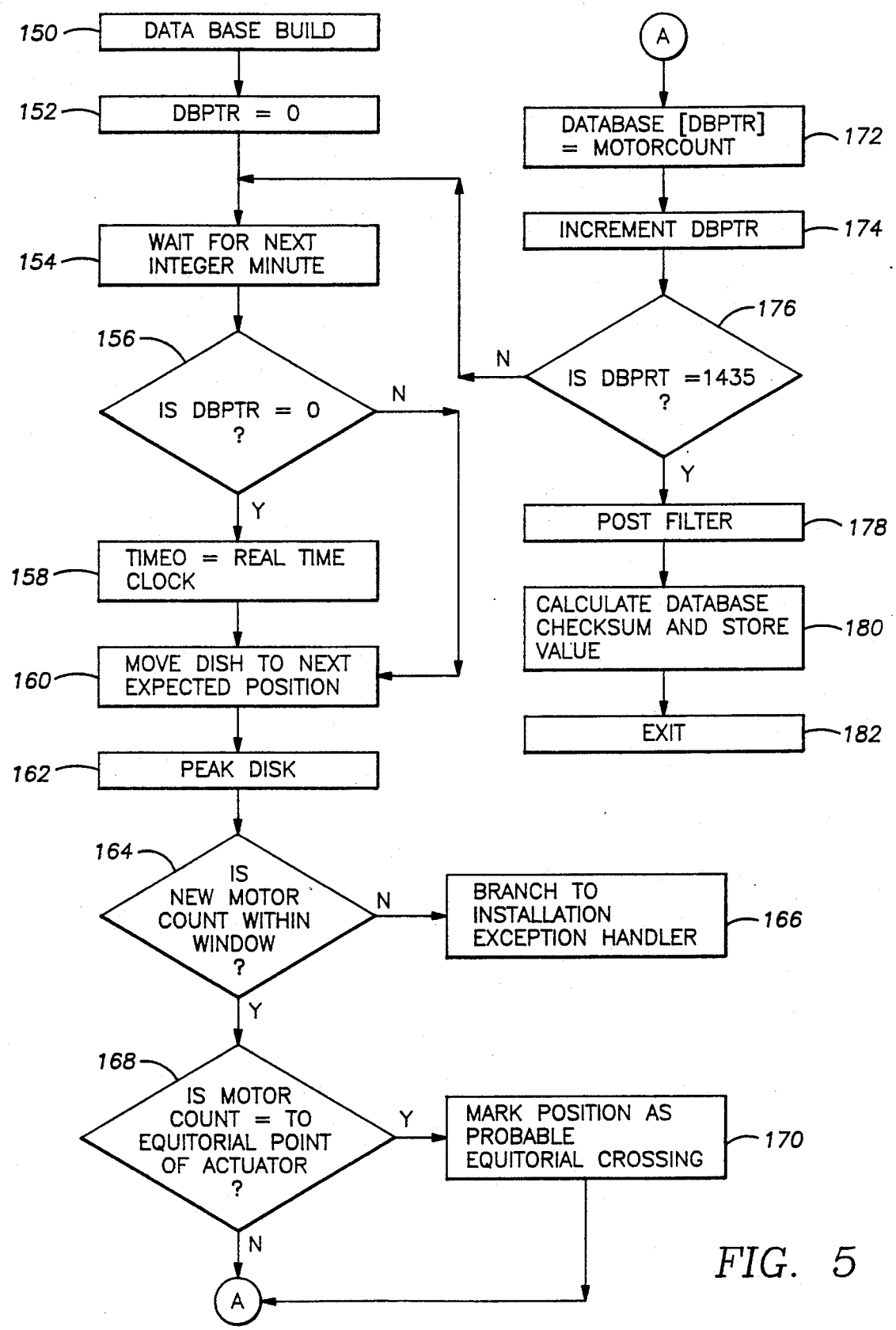

Referring now to FIG. 5, the data base build routine establishes satellite position information representative of each satellite's orbit cycle as a function of time. Steps 150, 152 and 154 enable the computer 20 to begin building the data base by setting the data base pointer (DBPTR) equal to zero and then waiting one minute before continuing. Steps 156, 158, 160 and 162 cause the computer 20 to check if the data base pointer is equal to zero, if so the time reference (TIME0) associated with this pointer (DBPTR=0) is set equal to the real time clock time, the antenna is moved to the next expected position and the received signal strength is peaked. If the data base pointer is not equal to zero, step 158 is not performed.

Step 164 causes the computer 20 to check if the new motor count is within a predefined window, usually representative of antenna beam width. If the new motor count is not within the window representative of beam width than step 166 may cause the computer 20 to branch to the installation exception handler routine which may alert the user to a potential problem. Step 168 causes computer 20 to determine if the motor count is representative of a position equivalent to the equator and, if so, mark the data base position as a probable equatorial crossing.

Steps 172, 174 and 176 cause the computer to store the motor count into the data base as a function of the data base pointer number, then increment this pointer by one and check if the pointer is equal to a maximum value of 1435. When the data base pointer is less than 1435, program control returns to step 154 and functions as above. Upon reaching the data base pointer count of 1435 which represents completion of the data base information acquisition, steps 178, 180 and 182 may cause the computer 20 to filter (smooth) the data base position information using a smoothing algorithm, calculate checksum and store, then exit from the data base build routine. This sequence may represent one orbit of the satellite.

The demand peaking mode may be initiated by the user and may also result in loss of signal. In the demand mode, the data base may be undated under manual control, but is not automatically discarded or revised as in the re-acquisition mode. When a user selects a specific satellite for reception, the program scheduler makes a timed entry point into the selected satellite data base.

Figure 6:
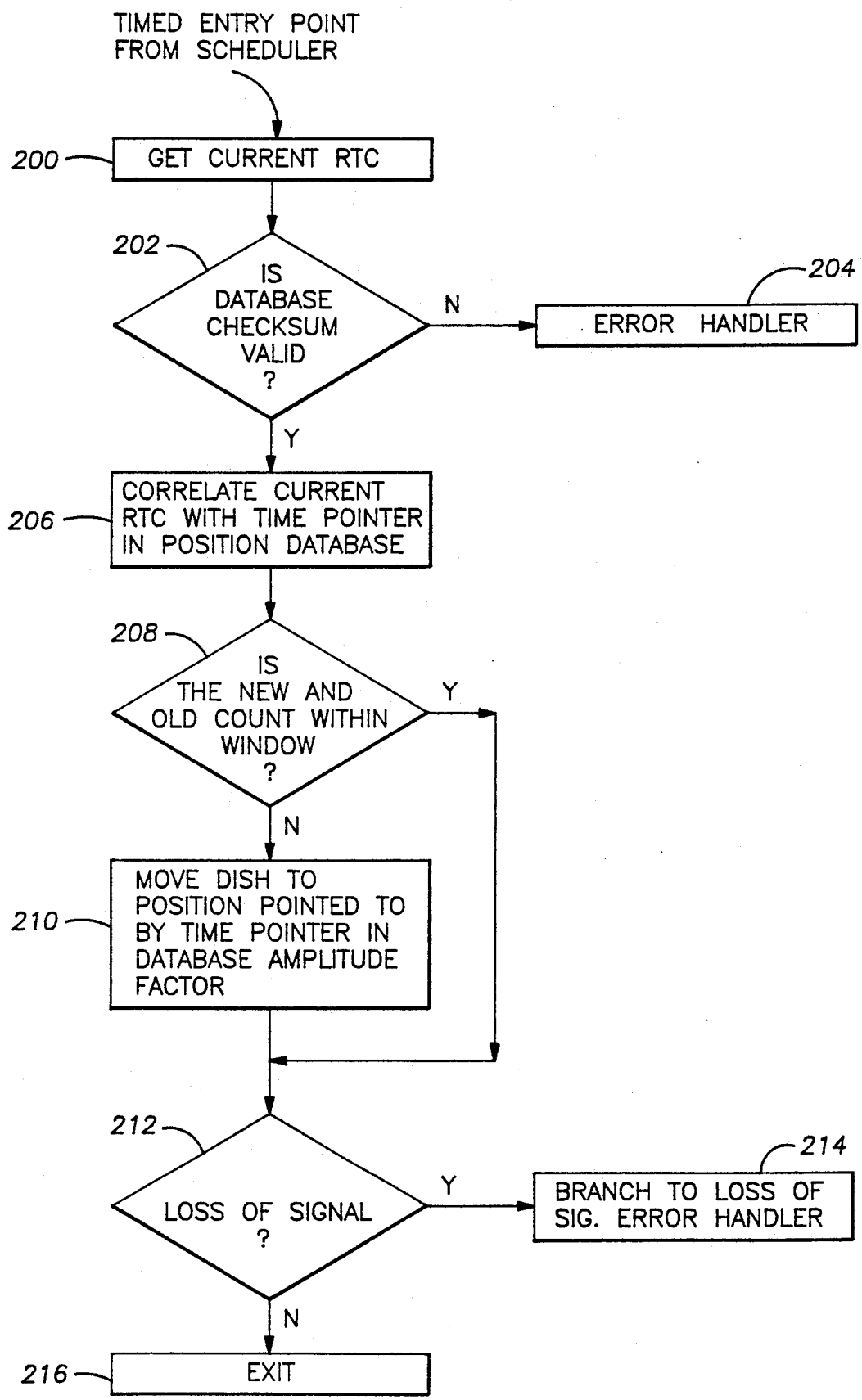

Now referring to FIG. 6, steps 200, 202, 204 and 206 cause computer 20 to read the current real time clock (RTC) information, validate the data base checksum value, if valid, correlate the real time clock with the time pointer representative of position count in the data base, but if not valid, may exit to an error handling routine which may alert the user to a problem.

Steps 208, 210, 212 and 216 cause the computer 20 to determine if the new and old motor counts are within the predefined beam width window, if so, check for loss of signal, if a signal is present then exit from this routine. If the new and old motor counts are not within the window then step 210 causes the computer 20 to correct the declination position by multiplying the data base position by an amplitude factor (AMPLITUDE FACTOR). If there is a loss of signal then step 214 causes the computer 20 to branch to the error handling routine.

Figure 7:
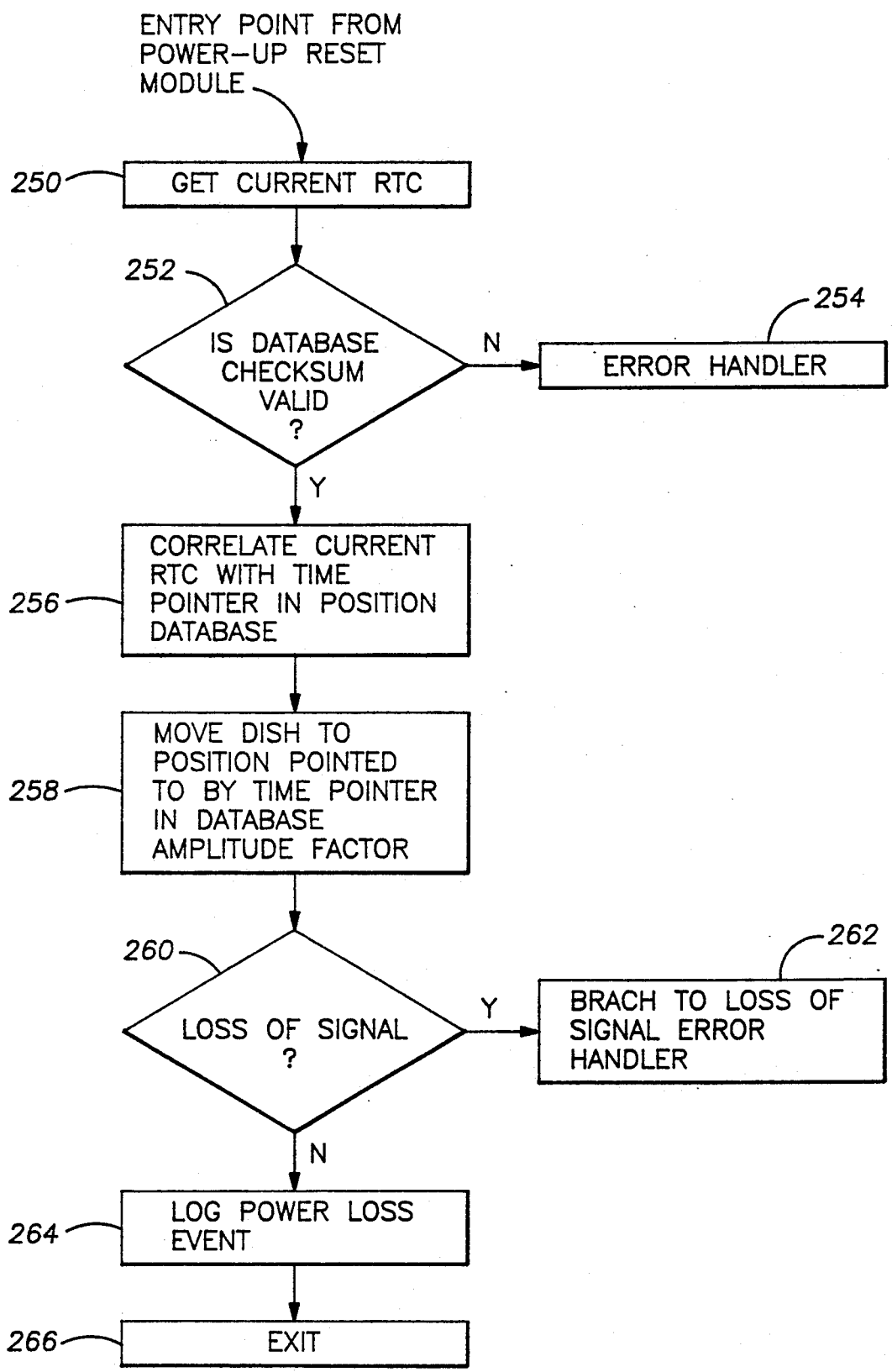

When a power failure occurs, the power-up reset routine causes the computer 20 to make a timed entry point into the last selected satellite data base. Now referring to FIG. 7, steps 250, 252, 254 and 256 cause the computer 20 to read the current real time clock information, validate the data base checksum value, if valid, correlate the real time clock with the time pointer representative of position count in the data base relative to time 0. If the database checksum is not valid, the program may cause the computer 20 to branch to an error handling routine.

Step 258 causes the computer 20 to correct the declination position by multiplying the data base position by the amplitude factor. The data base position is selected by the memory pointer which is representative of time. Step 260 causes the computer 20 to determine if there is a loss of signal. If there is no loss of signal, than step 264 may cause the computer 20 to record in memory the power loss event and exit the routine. If, however, there is a loss of signal, than step 262 may cause the computer 20 to shift control to the loss of signal error handling routine.

The timed mode uses the program's tracking algorithm to initiate a re-peak of the satellite's signal without the possibility of loss of signal. Loss of signal is prevented by correlative signal strength comparison over several narrow antenna sweeps to find the highest signal peak for a given motor count. The program causes the computer 20 to automatically update the data base if the new position representative of best signal is different than the expected position.

Figure 8:
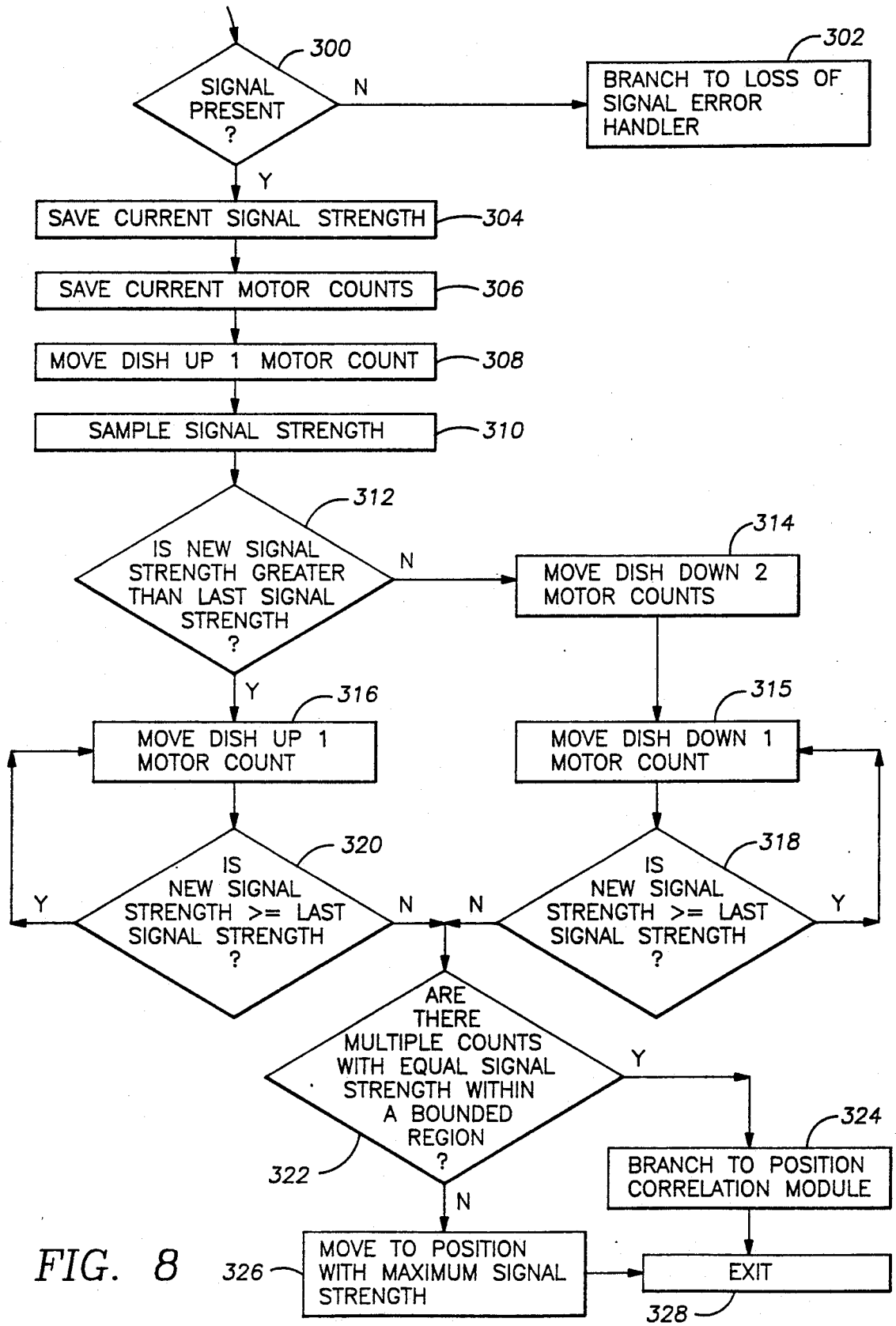

Referring now to FIG. 8, step 300 causes the computer 20 to determine whether a signal is being received. Next steps 304 and 306 cause computer 20 to save in memory the strength of the signal and the current motor count representative of antenna position. Steps 308 and 310 cause computer 20 to move the antenna declination up one motor count, and to sample the received signal strength resulting from the new antenna declination position. If a signal is not detected than step 302 may cause the computer 20 to branch control to the loss of signal error handling routine.

Step 312 causes the computer 20 to determine whether the new or old position signal strength is greater than the other. This determination is made by comparing the two different position signal strengths and then moving the antenna in the direction of greater recorded signal strength. This movement may result in the most probable direction of further antenna movement to improve signal strength.

If the signal at the new position, after the antenna is moved up one count, is not greater than the signal at the prior position, step 314 causes computer 20 to move the antenna one count below its original position. Then step 315 causes the computer 20 to move the antenna down one more motor count. Steps 315 and 318 cause the computer 20 to continue to move the antenna down until there is no improvement in signal strength.

If, however, the signal at the new position, after the antenna is moved up one count, is greater than the signal at the prior position, than step 316 causes the computer 20 to move the antenna up one more count. Steps 316 and 320 cause the computer 20 to continue to move the antenna declination up until there is no improvement in signal strength. Step 322 causes the computer 20 to check if there are equivalent signal strengths at different antenna positions within a bounded region. If there are multiple counts with equivalent signal strengths, than step 324 causes the computer 20 to branch to the position correlation routine. If there are no multiple counts with equivalent signal strengths, than step 326 causes the computer 20 to move the antenna to the position representative of maximum signal strength. Step 328 causes the computer to exit this routine.

Figure 9:
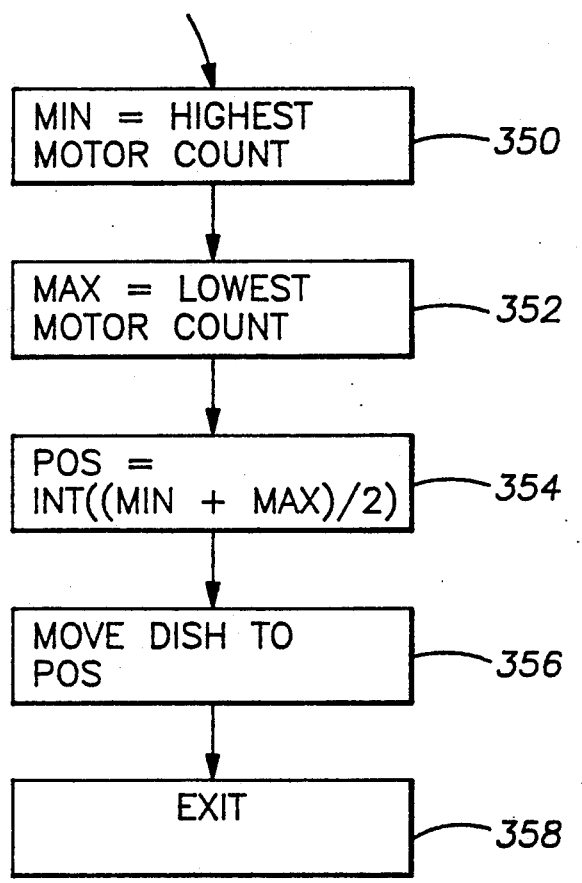

During the signal peaking process the system of the present invention may use correlative averaging when there are two or more maximum signal strengths at different motor count positions. Multiple maximum signal strengths at different antenna declination positions may be attributable to noise on the signal. Referring now to FIG. 9, steps 350, 352, 354, 356 and 358 cause the computer 20 to store in its memory the highest motor count of a maximum signal, store the lowest count of a maximum signal, average the highest and lowest motor counts and store this average in memory, move the antenna to the average motor count position which corresponds to the midpoint between the minimum and maximum antenna positions, and then exit from the position correlation routine.

After the characteristic inclined orbit information obtained over a period of one sidereal day has been acquired and stored appropriately in the data base, the system of the invention may post process this data. Post processing of the position information is performed in order to smooth out any random fluctuations caused by noise perturbations during orbit data acquisition. A non-recursive filtering algorithm is used to refine the recently acquired motor counts into a more evenly defined representation of satellite position. This algorithm may be represented by:

$$Pf(x) = [P(x-n) + \ldots + P(x) + \ldots + P(x+n)]/(2n+1),$$

where P is the declination position data value at time x and Pf(x) is the position averaged over the number of time interval samples. Each declination position is represented by a corresponding motor count stored in memory as a function of sample time.

Figure 10:
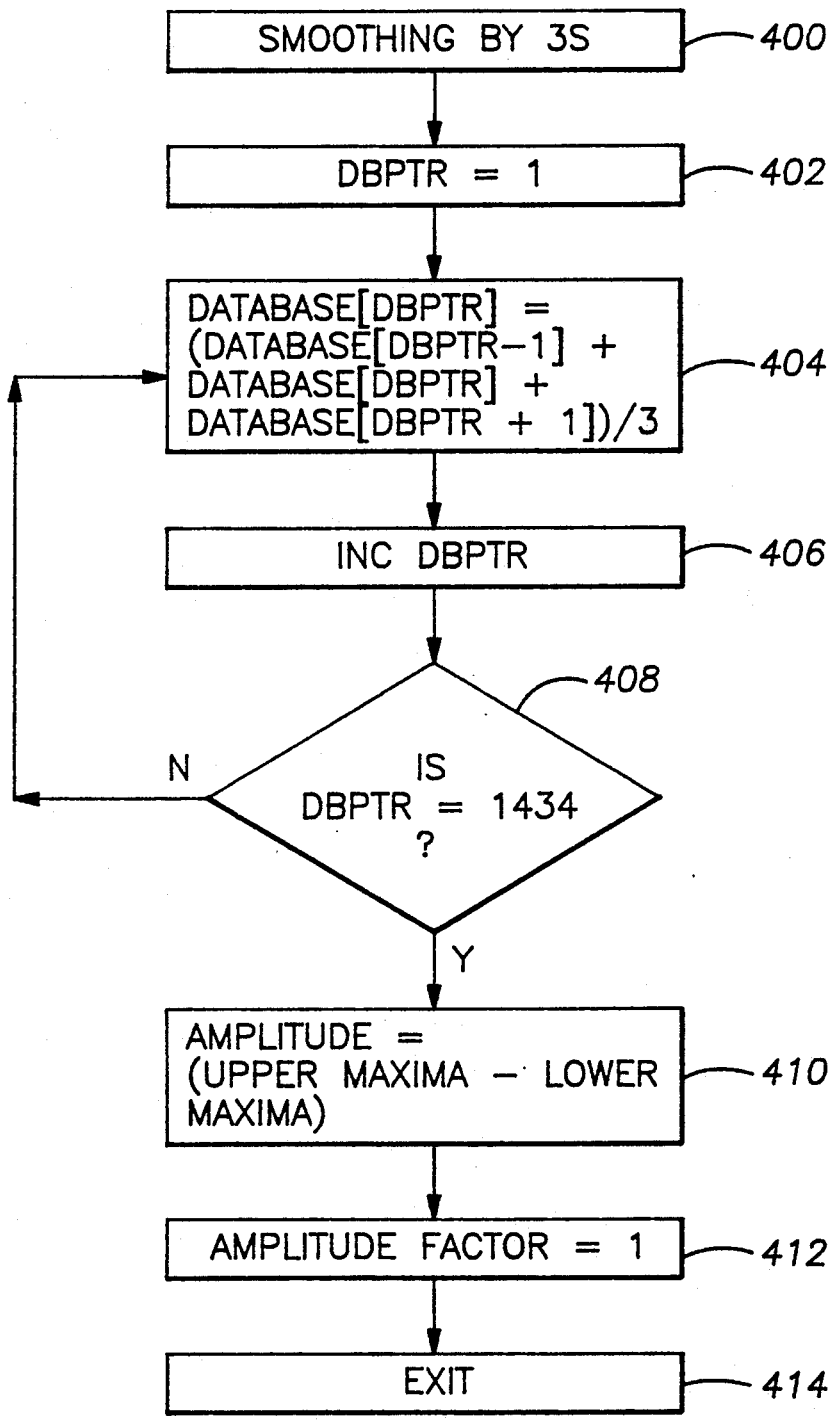

Now referring to FIG. 10, steps 400, 402 and 404 cause computer 20 to start the smoothing routine by setting the data base pointer equal to one and then averaging the data base position data located at pointer value one with the position data at pointer values zero and two. Steps 404, 406 and 408 cause the computer 20 to increment the data base pointer, check if the pointer is equal to 1434, if not, average the data located at the pointer with the data just before and after the pointer location, and when the pointer equals 1434 stop the averaging process. Steps 410, 412 and 414 cause the computer 20 to calculate the peak declination angle of an orbit by defining the amplitude as the difference between the lower maximum position from the upper maximum position of the antenna, defining the amplitude factor equal to one and then exiting the smoothing routine.

Multiple samples of the signal strength for each motor count are made and then a smoothing algorithm is used to decrease the effect of noise on the system operation. In a similar fashion to position smoothing, the signal strength of the data samples are smoothed by calculating an arithmetic mean of n signal strength samples, where n is an integer number. Signal strength samples are taken at equal time intervals.

Figure 11:
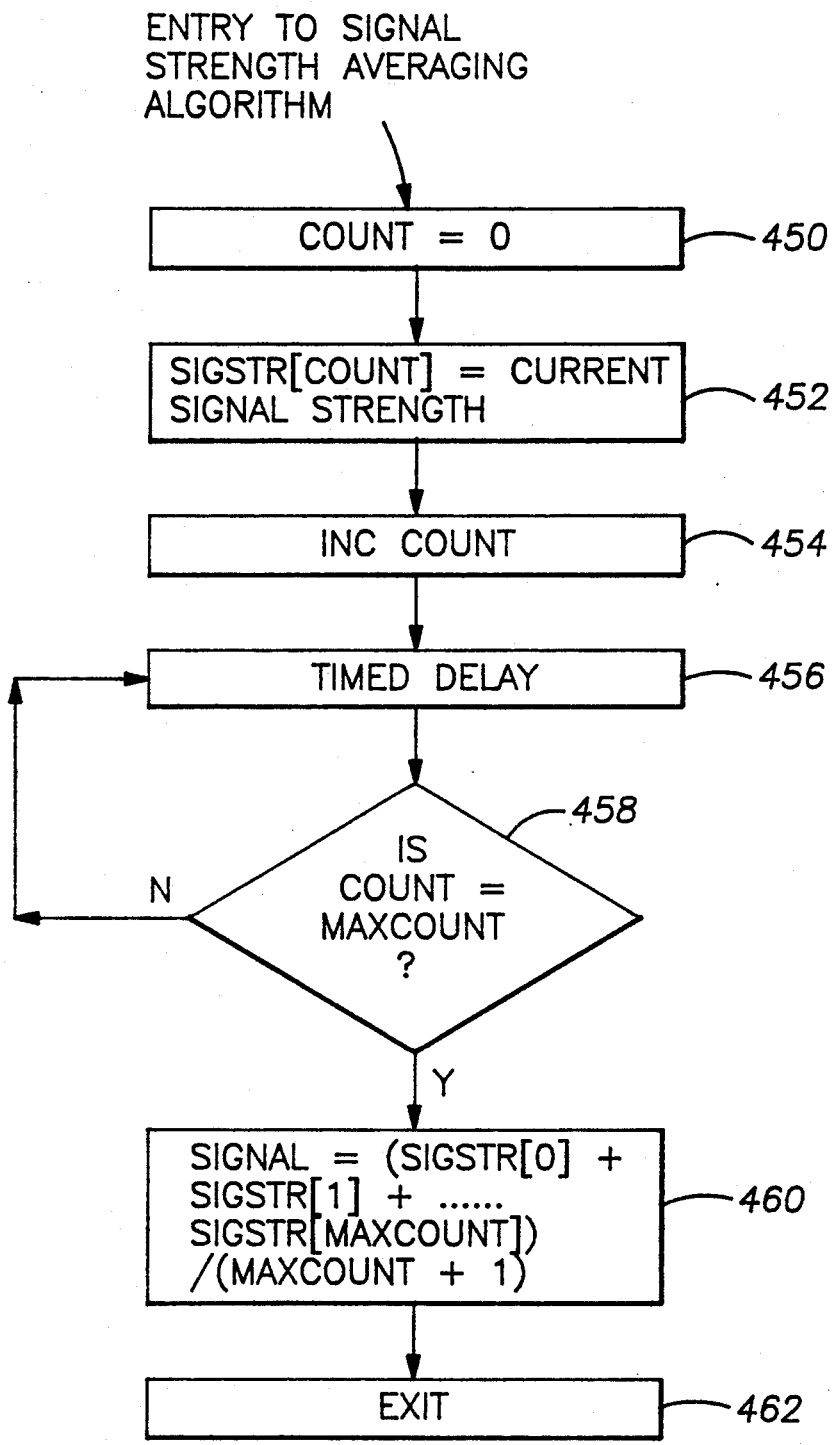

Now referring to FIG. 11, steps 450, 452, 454, 456, 458, 460 and 462 cause computer 20 to set a signal sample counter equal to zero, store a signal strength sample at a memory location designated by the counter value, increment the counter value, repeat the signal sample operation, determine if the counter is at maximum value, if so, average all of the signal samples taken, storing the average value of the signal samples and exiting the signal strength averaging routine.

The system of the invention may automatically or manually adjust declination amplitude by using a correction factor on the data base information as the peak declination of a satellite changes over time. The correction factor adjusts the data base values for an increase the north-south excursions of the satellite over time. A comparison of recent maximum north and south excursions are made to newly determined maximum excursions. Then a scale factor is calculated so as to adjust all of the data base values by the ratio of the change in the maximum positions. The tracking algorithm used is:

$$P = A * F(t),$$

where P is the desired antenna position in motor counts, A is the data base amplitude correction factor, t is the real time clock value correlated to the data base, and F(t) is the data base array value at a location represented by t.

Figure 12:
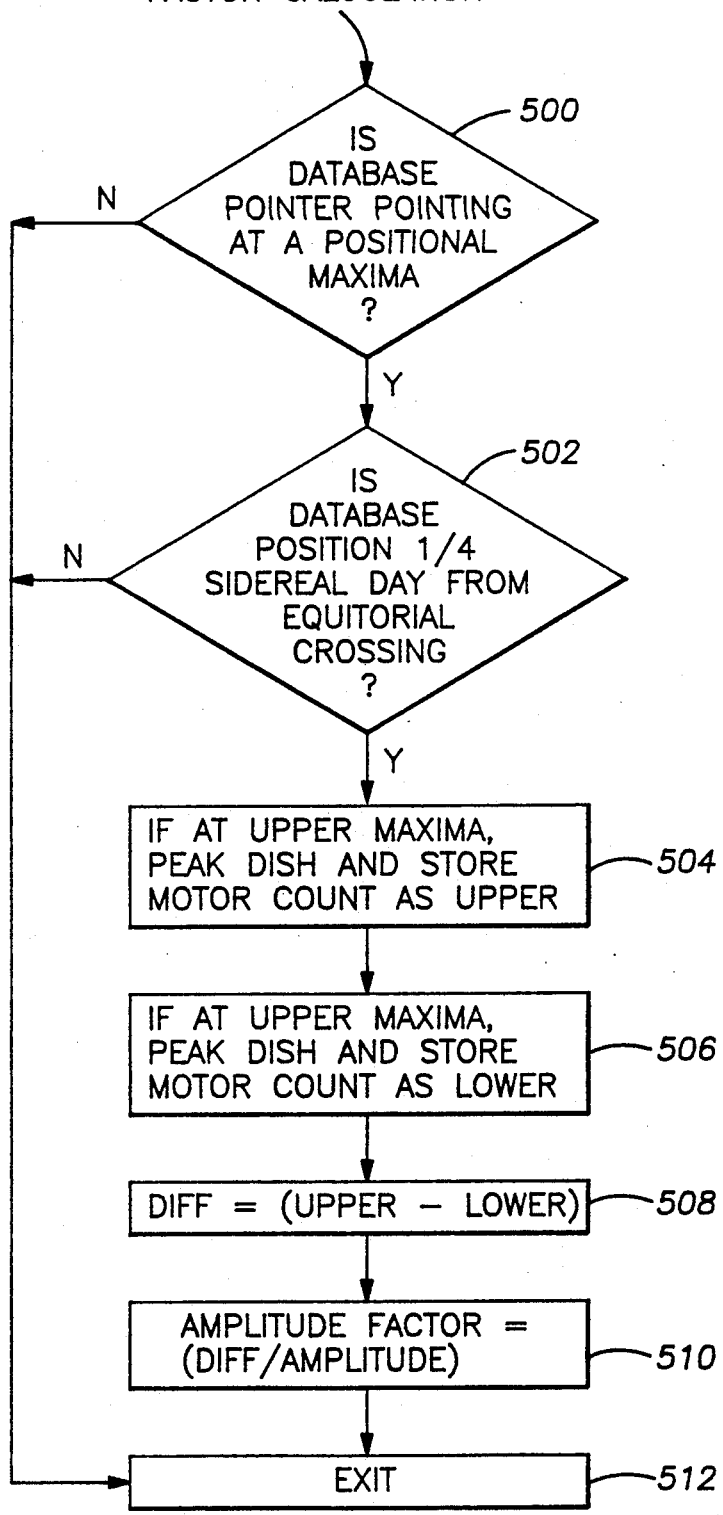

Referring to FIG. 12, steps 500 and 502 cause the computer 20 to determine when the present position is at a maximum and is one quarter (¼) sidereal day from an equatorial crossing. When both of these conditions exist, steps 504, 506, 508, 510 and 512 cause the computer 20 to peak the antenna position for best signal if the prior position is at an upper maximum then store the re-peaked position as a new upper maximum position, likewise, if the prior position is at a lower maximum then store the re-peaked position as a new lower maximum position, determine the difference between the upper and lower maximum positions and store the resulting position difference, store an amplitude factor as the new maximum position difference divided by the amplitude as defined in step 410 of FIG. 10, and then exit the routine of FIG. 12.

Detection of when a satellite crosses the equatorial plane is used to synchronize the satellite position data base time scale to the actual orbit. Comparison of the data base position information with the satellite's equatorial crossing gives the most accurate correction for drift between the system real-time clock and the satellite's orbit time. This correction is accomplished, at the time of expected equatorial crossing, by determining the position of best signal and shifting the current data base pointer, representative of time, to a data base position value equal to the determined best signal position.

Figure 13:
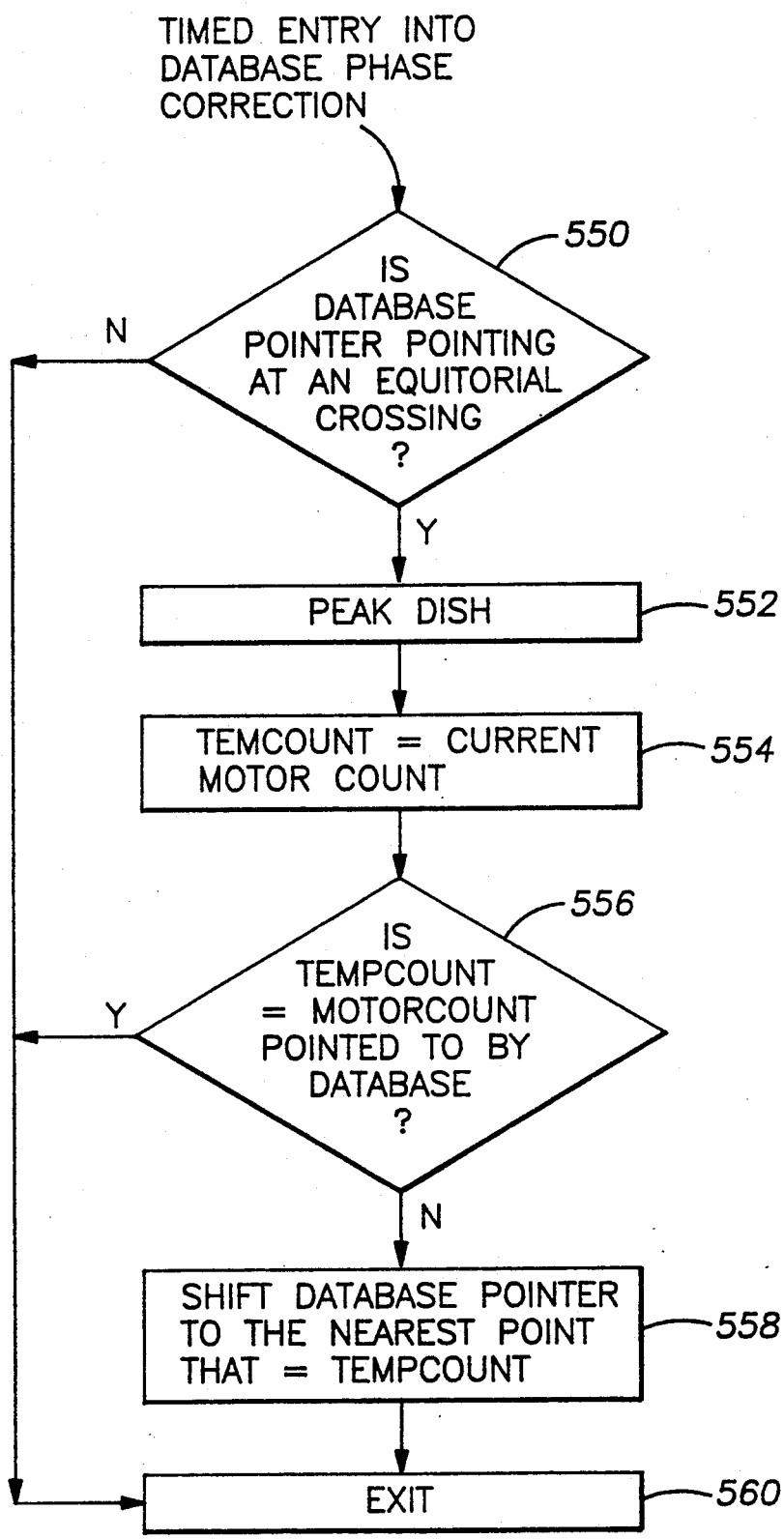

Referring now to FIG. 13, steps 550, 552 and 554 cause the computer 20 to determine when the data base position is at an equatorial crossing, when so determined, peak the signal strength by moving the antenna position and putting the current motor count in memory. Steps 556, 558 and 560 cause the computer 20 to compare the current motor count with the expected motor count in the data base, if different, shift the current data base pointer to the nearest position value that equals the current motor count and exit the data base phase correction routine.

Thus, it will be appreciated that a new and improved antenna mount has been described which automatically tracks and records the declination orbit of a geosynchronous satellite. Acquisition of position information for a satellite's orbit is performed within one sidereal day. Thereinafter, the invention automatically adjusts antenna mount position for optimum signal strength, changing declination orbit and periodically re-synchronizes the stored historical position data base with the actual equatorial crossing of the corresponding satellite.

The foregoing disclosure and description of the inventions are illustrative and explanatory thereof, and various changes in the size, shape, materials, components, circuit elements, wiring connections and contacts, as well as in the details of the illustrated circuitry and construction may be made without departing from the spirit of the invention. Various modifications and changes will be readily apparent to those skilled in the art and which are encompassed within the spirit of the invention and the scope of the appended claims.

What is claimed is:

1. An antenna mount for adjusting the declination position of an earth station antenna for geosynchronous orbit satellite communications, comprising:
   a mounting pole adapted for connection to a fixed structure;
   a fixed declination polar axis platform rotatably movable in a geosynchronous orbit arc, said fixed platform adjustably connected to said mounting pole;
   means for declination adjustment, said declination adjustment means pivotally connected to said fixed platform;
   a movable declination platform having a front face for mounting the antenna thereon, said platform pivotally connected to said declination adjustment means; and
   a coaxially wound coil spring, said coil spring connected to said declination adjustment means to prevent declination position error caused by backlash.

2. An antenna mount according to claim 1, wherein said fixed platform is rotatably aligned with the polar axis of the earth.

3. An antenna mount according to claim 1, further comprising means for fixed declination offset adjustment.

4. An antenna mount according to claim 1, wherein said declination adjustment means comprises:
   a motor driven linear actuator, said linear actuator pivotally connected to said moveable platform;
   a declination adjustment lever with first and second ends, said adjustment lever second end connected to said linear actuator;
   a transfer bar with first and second ends, said transfer bar fixedly connected to said adjustment lever first end, said transfer bar first end pivotally connected to said moveable platform;
   a transfer lever with first and second ends; said transfer lever first end pivotally connected to said transfer bar second end and said transfer lever second end pivotally connected to said fixed platform.

5. An antenna mount according to claim 3, wherein said fixed declination offset adjustment comprises:
   a support, said support connected to said moveable platform;
   an adjustable length member, said adjustable length member fixedly connected to said support and perpendicular to said moveable platform;
   a support ring, said ring attached to said adjustable length member end opposite said support; and
   a support pin, said support pin fixedly connected to said fixed platform and engaging said ring for moveable support of said moveable platform.

6. A method for continuously tracking the orbital inclination of a satellite in geosynchronous orbit by adjusting the declination position of an earth station communications antenna mount with a motorized actuator, comprising the steps of:
   calibrating a position signal representative of travel distance to an upper declination position of the antenna mount;
   calibrating a position signal representative of travel distance to a lower declination position of the antenna mount;
   initializing the declination position of the antenna mount to a midpoint of travel;
   calibrating equatorial position of the antenna mount by establishing signal reception from a non-inclined orbit geosynchronous satellite;

iteratively moving the declination position of the antenna mount so as to peak the signal of an inclined orbit geosynchronous satellite;

establishing an orbital tracking data base comprised of data values representative of antenna mount position representative of peak signal strength, each of said data values corresponding to a time interval within one orbital cycle; and changing the declination position of the antenna mount in accordance with said tracking data base thereafter as a function of time.

7. The method of claim 6, wherein the step of initializing the antenna midpoint of travel comprises:

deriving a plurality of counts each representative of a different antenna mount position;

calibrating a first count to an upper antenna mount position;

calibrating a second count to a lower antenna mount position;

calculating a midpoint declination position from said first and second counts; and moving the antenna mount to said midpoint position.

8. The method of claim 6, wherein the step of establishing an orbital tracking data base comprises the steps of:

moving the antenna mount along a geosynchronous arc so as to receive a desired satellite signal;

moving the antenna mount declination in a north direction;

recording a signal strength change resulting from said north direction movement;

moving the antenna mount declination in a south direction;

recording a signal strength change resulting from said south direction movement;

comparing said north and south movement signal strength changes to determine an antenna mount position for obtaining a maximum signal strength representative of satellite orbital position; and storing a plurality of said position data values in memory, each data value representative of orbital position corresponding to a time interval within a sidereal day orbit.

9. The method of claim 8, further comprising the step of smoothing said data values representative of antenna mount position stored in memory by averaging each position data value with data values earlier in time and data values later in time using the equation $$Pf(x)=[P(x-n)+\ldots +P(x)+\ldots +P(x+n)]/(2n+1),$$

where P is the position data value at time x and Pf(x) is the position averaged over the number of time interval samples n.

10. The method of claim 8, further comprising the step of smoothing said signal strength values by calculating an arithmetic mean of a plurality of signal strength values taken at equal time intervals.

11. The method of claim 8, further comprising the steps of:

calculating a checksum of said position values; and storing said checksum in memory.

12. The method of claim 6, wherein the step of changing the antenna mount declination position corresponding to each time interval within one orbital cycle comprises the steps of:

correlating a data base time pointer with a real time clock;

comparing a first data value representative of the antenna mount present position with a second data value specified by said time pointer;

moving the antenna mount to a position determined by said second data value multiplied by an amplitude factor if said first and second data values differ by a specified amount.

13. The method of claim 12, further comprising the step of recording a power loss event in memory.

14. The method of claim 6, wherein the step of changing the antenna mount declination position corresponding to each time interval within one orbital cycle comprises the steps of:

storing a position data value in memory;

determining and storing a signal strength data value in memory representative of said position;

moving the position of the antenna mount incrementally in a north direction;

determining and storing a new signal strength data value in memory representative of said north movement;

comparing said signal and new signal data values to determine the position of greater signal strength;

moving the antenna mount in the direction of greater signal strength;

repeating movement of the antenna mount position in a north or south direction depending on which direction gives the greater signal strength;

comparing said north or south movement signal strength changes to determine an antenna mount position for obtaining a maximum signal strength representative of satellite orbital position; and storing a plurality of antenna mount position data values in memory, each value representative of maximum signal strength corresponding to each time interval within an orbital sidereal day.

15. The method of claim 14, further comprising the steps of:

detecting multiple maximum signal strength value representative of different mount positions within a given period of sampling time;

averaging a highest and lowest position representative of said maximum signal strength;

storing said average position in memory; and moving the antenna mount to said average position.

16. The method of claim 12, wherein the step of moving the antenna mount comprises the steps of:

determining if a position data value is representative of a maximum upper or lower antenna mount position;

determining whether said data value is representative of an antenna mount position one quarter sidereal day from an equatorial crossing;

determining and storing new upper and lower position data values by iteratively moving the antenna mount for maximum signal strength such that said new position data values are representative of prior upper and lower position data values occurring at one quarter sidereal day from an equatorial crossing; and calculating an amplitude factor equal to the difference between said new upper and lower position data values divided by the difference between said prior upper and lower position data values.

17. The method of claim 6, further comprising the steps of:

determining whether a present position data value indexed in memory by a data base pointer and representative of present antenna mount position is at an equatorial orbit crossing;

determining and storing a new position data value by iteratively moving the antenna mount for maximum signal strength such that said new position data value is representative of a maximum signal strength;

comparing said present and new position data values to determine whether said present and new data values are not equal; and changing said data base pointer value to obtain a position data value in memory equal to said new position data value.

18. An apparatus for continuously tracking the orbital inclination of a satellite in geosynchronous orbit by adjusting the declination position of an earth station communications antenna mount with a motorized actuator comprising:

means for calibrating a position signal representative of travel distance to an upper declination position of the antenna mount;

means for calibrating a position signal representative of travel distance to a lower declination position of the antenna mount;

means for initializing the declination position of the antenna mount to a midpoint of travel;

means for calibrating equatorial position of the antenna mount by establishing signal reception from a non-inclined orbit geosynchronous satellite;

means for iteratively moving the declination position of the antenna mount so as to peak the signal of an inclined orbit geosynchronous satellite;

means for establishing an orbital tracking data base comprised of data values representative of antenna mount position representative of peak signal strength, each of said data values corresponding to a time interval within one orbital cycle; and means for charging the declination position of the antenna mount in accordance with said tracking data base thereafter as a function of time.

19. The apparatus of claim 18, wherein the means for initializing the antenna midpoint of travel comprises:

means for deriving a plurality of counts each representative of a different antenna mount position;

means for calibrating a first count to an upper antenna mount position;

means for calibrating a second count to a lower antenna mount position;

means for calculating a midpoint declination position from said first and second counts; and means for moving the antenna mount to said midpoint position.

20. The apparatus of claim 18, wherein the means for establishing an orbital tracking data base comprises:

means for moving the antenna mount along a geosynchronous arc so as to receive a desired satellite signal;

means for moving the antenna mount declination in a north direction;

means for recording a signal strength change resulting from said north direction movement;

means for moving the antenna mount declination in a south direction;

means for recording a signal strength change resulting from said south direction movement;

means for comparing said north and south movement signal strength changes to determine an antenna mount position for obtaining a maximum signal strength representative of satellite orbital position; and means for storing a plurality of said position data values in memory, each data value representative of orbital position corresponding to a time interval within a sidereal day orbit.

21. The apparatus of claim 20, further comprising means for smoothing said data values representative of antenna mount position stored in memory by averaging each position data value with data values earlier in time and data values later in time using the equation $Pf(x) = [P(x-n) + \ldots + P(x) + \ldots + P(X+n)]/(2n+1)$, where P is the position data value at time x and $Pf(x)$ is the position averaged over the number of time interval samples n.

22. The apparatus of claim 20, further comprising means for smoothing said signal strength values by calculating an arithmetic mean of a plurality of signal strength values taken at equal time intervals.

23. The apparatus of claim 20, further comprising:

means for calculating a checksum of said position values; and means for storing said checksum in memory.

24. The apparatus of claim 20, wherein the means for changing the antenna mount declination position corresponding to each time interval within one orbital cycle comprises:

means for correlating a data base time pointer with a real time clock;

means for comparing a first data value representative of the antenna mount present position with a second data value specified by said time pointer; and means for moving the antenna mount to a position determined by said second data value multiplied by an amplitude factor if said first and second data values differ by a specified amount.

25. The apparatus of claim 24, further comprising means for recording a power loss event in memory.

26. The apparatus of claim 18, wherein the means for changing the antenna mount declination position corresponding to each time interval within one orbital cycle comprises:

means for storing a position data value in memory;

means for determining and storing a signal strength data value in memory representative of said position;

means for moving the position of the antenna mount incrementally in a north direction;

means for determining and storing a new signal strength data value in memory representative of said north movement;

means for comparing said signal and new signal data values to determine the position of greater signal strength;

means for moving the antenna mount in the direction of greater signal strength;

means for repeating movement of the antenna mount position in a north or south direction depending on which direction gives the greater signal strength;

means for comparing said north and south movement signal strength changes to determine an antenna mount position for obtaining a maximum signal strength representative of satellite orbital position; and means for storing a plurality of antenna mount position data values in memory, each value representative of maximum signal strength corresponding to each time interval within an orbital sidereal day.

27. The apparatus of claim 26, further comprising:

means for detecting multiple maximum signal strength values representative of different mount positions within a given period of sampling time;

means for averaging a highest and lowest position representative of said maximum signal strength;

means for storing said average position in memory; and means for moving the antenna mount to said average position.

28. The apparatus of claim 24, wherein the means for moving the antenna mount comprises:

means for determining if a position data value is representative of a maximum upper or lower antenna mount position;

means for determining whether said data value is representative of an antenna mount position one quarter sidereal day from an equatorial crossing;

means for determining and storing new upper and lower position data values by iteratively moving the antenna mount for maximum signal strength such that said new position data values are representative of prior upper and lower position data values occurring at one quarter sidereal day from an equatorial crossing; and means for calculating an amplitude factor equal to the difference between said new upper and lower position data values divided by the difference between said prior upper and lower position data values.

29. The apparatus of claim 18, further comprising:

means for determining whether a present position data value indexed in memory by a data base pointer and representative of present antenna mount position is at an equatorial orbit crossing;

means for determining and storing a new position data value by iteratively moving the antenna mount for maximum signal strength such that said new position data value is representative of a maximum signal strength;

means for comparing said present and new position data values to determine whether said present and new data values are not equal; and means for changing said data base pointer value to obtain a position data value in memory equal to said new position data value.

* * * * *